United States Patent [19]

Berger

[11] Patent Number: 4,947,153

[45] Date of Patent: Aug. 7, 1990

[54] APPARATUS FOR MONITORING THE FLOW OF FLUID FROM A METERING PUMP

[75] Inventor: Hermann Berger, Heidelberg, Fed. Rep. of Germany

[73] Assignee: ProMinent Dosiertechnik GmbH, Heidelberg, Fed. Rep. of Germany

[21] Appl. No.: 400,581

[22] Filed: Aug. 29, 1989

[30] Foreign Application Priority Data

Aug. 31, 1988 [DE] Fed. Rep. of Germany ....... 3829512

[51] Int. Cl.$^5$ .......................................... G08B 21/00
[52] U.S. Cl. .................................. 340/608; 340/618; 417/53; 137/551
[58] Field of Search ............... 340/608, 606, 623, 618; 417/53; 137/551, 553, 554

[56] References Cited

U.S. PATENT DOCUMENTS 4,413,950 11/1983 Wiernicki .............................. 417/53
4,507,062 3/1985 Wally .................................. 417/413
4,537,565 8/1985 Elder .................................. 417/413

FOREIGN PATENT DOCUMENTS 3122778 6/1982 Fed. Rep. of Germany .
3210822 10/1983 Fed. Rep. of Germany .
3641737 6/1988 Fed. Rep. of Germany .

OTHER PUBLICATIONS

Halbleiter-Schaltungstechnik by U. Tietze and Ch. Schenk, pp. 176-177, 1985.

Primary Examiner—Joseph A. Orsino
Assistant Examiner—Jeffery A. Hofsass
Attorney, Agent, or Firm—Peter K. Kontler

[57] ABSTRACT

The upwardly extending outlet of a pump contains a non-floating permanent magnet which tends to assume a lower end position but is propelled upwardly in response to admission of a metered quantity of liquid into the outlet to initiate the emission of a signal by a sensor. The emission of such signal persists as long as the actuator remains above its lower end position. The sensor is connected with the resetting input of a counter by way of an OR circuit. The n-th output of the counter transmits a signal to an alarm signal generating circuit in response to transmission of a certain number of consecutive timing pulses to its counting input prior to transmission of a signal to the resetting input. The timing pulses are transmitted by a generator which also transmits pulses to the pump to thus determine the frequency of admission of liquid into the outlet. A rectangular wave oscillator receives signals from the sensor and transmits a series of signals to the OR circuit with a delay which equals or approximates the length of the interval between two consecutive timing pulses. The oscillator starts to transmit signals to the OR circuit only if the signal which is emitted by the sensor persists during the aforementioned delay. This ensures that no alarm signal is generated if the viscosity of pumped liquid is so high that the actuator is incapable of returning to its lower end position during the interval between successive admissions of liquid into the outlet.

14 Claims, 1 Drawing Sheet

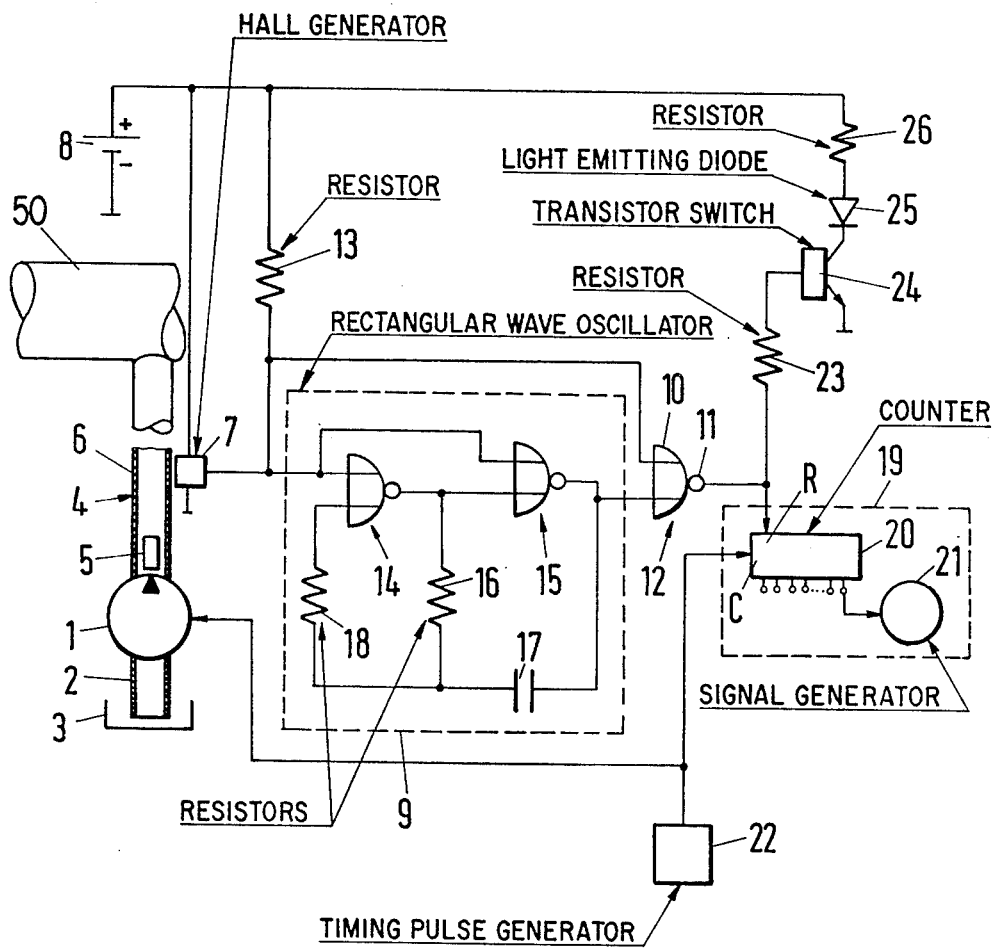

APPARATUS FOR MONITORING THE FLOW OF FLUID FROM A METERING PUMP

BACKGROUND OF THE INVENTION

The invention relates to apparatus for monitoring the operation of fluid flow machines, and more particularly to improvements in apparatus for monitoring the flow of liquids in the outlets of metering pumps.

It is known to provide a metering pump with an upwardly extending outlet and to install in the outlet a non-floating actuator for a sensor which generates a presence indicating signal whenever a working stroke of the pump results in the propulsion of a metered quantity of liquid into the pump outlet whereby the actuator rises to the level or into the range of the sensor to thereupon descend to its lower end position. The sensor transmits presence indicating signals to an evaluating circuit which generates an alarm or defect signal in response to detected absence of such signals, e.g., in response to detected absence of a predetermined number (n) of successive presence indicating signals, namely in response to a predetermined number of idle or ineffective strokes of the pumping element (e.g., a piston or a membrane) in the metering pump.

Monitoring apparatus of the above outlined character are normally installed in or combined or otherwise associated with pumps which are designed to admit metered quantities of a first fluid into a body or flow of a second fluid at desired intervals and/or in desired quantities. In accordance with a presently known proposal, the monitoring apparatus monitors the movements of the non-floating actuator which rises in response to admission of a metered quantity of liquid into the outlet to thereupon descend and reassume its starting (lower end) position. Each lifting of the actuator results in the generation of a presence indicating signal which is evaluated and prevents the generation of an alarm or defect signal.

Monitoring apparatus which employ non-floating actuators for sensors serving to emit presence indicating signals operate satisfactorily when the viscosity of the conveyed liquid is sufficiently low to ensure that the actuator will invariably reassume its lower end position between successive working strokes of the pump. If the viscosity of the conveyed liquid is high, the actuator remains in raised position and causes the sensor to emit an uninterrupted presence indicating signal, i.e., the evaluating circuit generates a continuous feedback signal. If such feedback signal persists for an interval of time which is longer than that required by the pump to perform a predetermined number of successive working strokes, the evaluating circuit generates an error or alarm signal even though the operation of the metering pump is entirely satisfactory.

German Offenlegungsschrift No. 36 41 737 of Fecker et al. discloses an apparatus which monitors the outlet of a lubricant supplying pump. The apparatus comprises a photoelectronic detector which monitors the level of a spherical actuator in the outlet and transmits signals to an evaluating circuit in order to arrest the machine which receives lubricant when the detector indicates that the actuator dwells in its lower end position while the pump is supposed to deliver lubricant. This publication does not discuss the problems which arise when the viscosity of the conveyed fluid changes. Moreover, such problems are not likely to arise when the apparatus is designed to monitor the operation of a pump which serves to convey only a lubricant or another fluid the viscosity of which is high or very high.

German Offenlegungsschrift No. 32 10 822 of Arens discloses a metering apparatus wherein a circuit receives signals from a pulse generator and generates a defect signal in response to detection of improper operation of the metering pump and/or in response to improper operation of the electronic circuit of the metering pump.

German Offenlegungsschrift No. 31 22 778 of Wiernicki (corresponding to U.S. Pat. application Ser. No. 191,055 filed Sept. 25, 1980) discloses an electromagnetic piston pump wherein the piston carries a magnet, and a Hall generator which monitors the position of the magnet. The polarity of signals which are transmitted by the Hall generator changes in response to movement of the magnet to different positions. An electronic circuit evaluates the signals from the Hall generator and energizes a solenoid which serves to move the piston between its positions.

OBJECTS OF THE INVENTION

An object of the invention is to provide an apparatus which can reliably monitor the operation of a metering pump irrespective of the viscosity of conveyed liquids.

Another object of the invention is to provide the apparatus with novel and improved means for evaluating signals which are generated by the sensor or detector of flow of fluid into and beyond the outlet of the metering pump.

A further object of the invention is to provide an apparatus which is less likely to generate false alarms than heretofore known apparatus.

An additional object of the invention is to provide the apparatus with novel and improved means for preventing the generation of false alarms.

Still another object of the invention is to provide novel and improved means for preventing the generation of false alarms when the viscosity of conveyed liquid changes but the operation of the metering pump remains satisfactory.

Another object of the invention is to provide an apparatus which operates satisfactorily irrespective of the viscosity of conveyed fluid and is capable of indicating a variety of defects including improper operation of the metering pump and the exhaustion of the supply of liquid which is to be metered by the pump.

A further object of the invention is to provide a novel and improved method of preventing the generation of false alarms when the viscosity of metered liquid changes.

SUMMARY OF THE INVENTION

The invention is embodied in an apparatus for monitoring the flow of a liquid in an upwardly extending outlet of a metering pump which admits into the outlet metered quantities of liquid at preselected intervals. The apparatus comprises a signal emitting sensor (e.g., a Hall generator) which is adjacent the outlet of the pump, a non-floating actuator (e.g., a permanent magnet) which is provided in the outlet and is operative to rise in the outlet from an inoperative or ineffective position at least in response to the first of a series of successive admissions of liquid into the outlet to thereby induce the emission by the sensor of a presence indicating signal which persists until the actuator reassumes its inoperative position (thus, the signal which is emitted by the sensor persists if the viscosity of pumped liquid is rather high so that the actuator is incapable of descending to its inoperative positions during the intervals between successive admissions of liquid into the outlet), evaluating means including alarm signal generating means, and an oscillator (particularly a rectangular wave oscillator) which has input means connected with the sensor and output means connected with the evaluating means. The oscillator serves to transmit to the evaluating means signals with a delay (which equals or approximates one of the preselected intervals) only when the signal from the sensor persists for the duration of the delay, i.e., only when the actuator fails to reassume its inoperative position during the period of time which elapses from the emission of a signal by the sensor to the expiration of the delay.

The apparatus preferably further comprises an OR circuit having an output connected with the evaluating means, a first input connected with the sensor and a second input connected with the output means of the oscillator. The alarm signal generating means of the evaluating means is operative to generate an alarm signal in response to the absence of a signal from the output of the OR circuit during a preselected number of successive preselected intervals.

The input means of the oscillator preferably comprises a first NOR circuit with a first input connected to the sensor, a second input and an output. The output means of such oscillator preferably comprises a second NOR circuit with a first input connected to the sensor, a second input connected to the output of the first NOR circuit, and an output connected to the second input of the OR circuit. The oscillator with such input and output means further comprises an R-C circuit which is connected between the outputs of the NOR circuits. The resistance of the R-C circuit is preferably connected to the second input of the first NOR circuit by a high ohmic resistance. Means can be provided for connecting the first input of the first NOR circuit with the first input of the OR circuit.

The evaluating means can further comprise a counter having a resetting input which is connected with the output of the OR circuit and at least one output connected with the alarm signal generating means. The counter further comprises a counting input, and such apparatus preferably further comprises means (such as a timing pulse generator) for transmitting to the counting input of the counter pulses at the aforementioned preselected intervals. The at least one output of the counter is operative to transmit to the alarm signal generating means a signal in response to transmission of a predetermined number of pulses to the counting input in the absence of a signal from the output of the OR circuit to the resetting input of the counter.

The frequency of signal transmission by the rectangular wave amplifier at least matches the frequency of admission of liquid into the outlet of the pump.

If provided, the aforementioned timing pulse generator is operative to transmit to the pump timing pulses at the preselected intervals so that the frequency of admission of liquid into the pump outlet matches the frequency of timing pulses which are transmitted to the pump and to the counting input of the counter in the evaluating means.

The apparatus can further comprise means for generating visible signals in response to signals at the output of the OR circuit. Such means for generating visible signals can comprise a radiation source (e.g., a light emitting diode) in series with a source of electrical energy and a logic element (e.g., a transistor switch) between the output of the OR circuit and the radiation source.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single Figure of the drawing is a block diagram of an apparatus which embodies one form of the invention and wherein the actuator for the sensor is shown in its inoperative position because the pump is idle, because the pump is defective or because the intake of the pump fails to receive metered quantities of liquid for any other reason.

DESCRIPTION OF PREFERRED EMBODIMENTS

The drawing shows an electromagnetic diaphragm type metering pump 1 with a suction intake 2 which can draw a liquid from a suitable source 3, e.g., a tank or another vessel. The pump 1 further comprises an upwardly extending outlet 4 which discharges metered quantities of liquid during each operating stroke of the membrane. For example, the outlet 4 can serve to deliver metered quantities of a first liquid (from the source 3) into a stream of a second liquid in a conduit 50.

A feature of the invention resides in the provision of an apparatus having means for generating a defect signal if the pump 1 fails to deliver metered quantities of first liquid, e.g., because the source 3 is empty, because the pump 1 is defective or because the column of liquid in the outlet 4 has evaporated during a prolonged period of idleness of the pump. The apparatus comprises means for monitoring the flow of liquid from the pump 1 toward the conduit 50, i.e., for monitoring the flow of liquid in the outlet 4. To this end, the outlet 4 contains a non-floatable or non-buoyant actuator 5 which rests in the illustrated inoperative lower end position when the pump 1 is idle or between successive liquid-delivering strokes of the pump when the latter is called upon to deliver a low-viscosity liquid. The illustrated actuator 5 is a rod- or a bar-shaped permanent magnet. When it is permitted to assume the illustrated inoperative position, the actuator 5 is located at a level below an outlet portion 6 which is adjacent a sensor 7, e.g. a Hall generator. The latter is installed at a predetermined distance from and above the body or housing of the pump 1, and its output is connected with one input of a NOR circuit or NOR gate 14 constituting the input means of a rectangular wave oscillator 9. The arrangement is such that the sensor (Hall generator) 7 emits a presence indicating signal (e.g., an 0-signal) when a surge of liquid which is propelled by the pump 1 to flow in the outlet 4 toward the conduit 50 causes the actuator 5 to rise to the level of the outlet portion 6. The sensor 7 emits an absence-denoting signal (e.g., a 1-signal) when the actuator 5 is permitted to descend to a level below that of the outlet portion 6. The sensor 7 receives electrical energy from a source 8.

The oscillator 9 operates with a predetermined delay following reception of an 0-signal from the actuator 7, and its output means (NOR circuit) 15 is connected to one input of a NOR circuit or NOR gate 12 which includes an OR gate or OR circuit 10 and an inverter 11 at the output of the OR circuit. Furthermore, the oscillator 9 is started only when the 0-signal at the output of the actuator 7 persists for a predetermined period of time. The NOR circuit 12 has two inputs the other of which is directly connected to the output of the actuator 7. The output of the actuator 7 is further connected with the positive pole of the energy source 8 by way of a high ohmic resistance 13.

The oscillator 9 comprises the aforementioned NOR circuits 14 and 15, an ohmic resistance 16 between the output of the NOR circuit 14 and one input of the NOR circuit 15, a capacitor 17 in series with the resistance 16, and a high ohmic resistance 18. The resistance 18 is connected with the other input of the NOR circuit 14, and the output of the actuator 7 is further connected with the other input of the NOR circuit 15. The resistance 16 and the capacitor 17 form an R-C circuit which connects the output of the NOR circuit 14 with the output of the NOR circuit 15. The resistances 16 and 18 are connected in series. The one input of the NOR circuit 14 is the actual input of the oscillator 9; this one input of the NOR circuit 14 is further connected with the other input of the NOR circuit 15 and with the one input of the OR circuit 10 forming part of the NOR circuit 12. The output of the NOR circuit 15 is the actual output of the oscillator 9 and is connected with the one input of the OR circuit 10. An oscillator of the type capable of being used in the apparatus of the present invention is disclosed on pages 176–177 of "Halbleiter Schaltungstechnik" by U. Tietze and Ch. Schenk.

The apparatus further comprises an evaluating circuit 19 with a counter 20 and an alarm signal generator 21. The counter 20 comprises a resetting input R and a counting input C. The resetting input R is connected with the output of the NOR circuit 12, and the counting input C is connected with the output of a timing pulse generator 22. The output of the timing pulse generator 22 is further connected to the pump 1 to determine the frequency at which the pump 1 performs its operating strokes, i.e., the duration of intervals between successive admissions of liquid into the outlet 4. The diaphragm of the pump 1 performs a working stroke and causes a stream of liquid to flow from the intake 2 into and upwardly in the outlet 4 in response to each pulse from the timing pulse generator 22.

The output of the NOR circuit 12 is further connected to the control input of an electronic switching or logic element 24 (in the form of a transistor switch) by way of a series resistor 23. The switching element 24 is in series with a radiation source 25 (here shown as a light emitting diode) which is further connected with the positive pole of the energy source 8 by way of a series resistor 26.

The input of the alarm signal generator 21 is connected with one of several outputs of the counter 20, e.g., with the ninth of a series of nine outputs. In the absence of transmission of a signal to the resetting input R, the counter 20 generates signals at successive outputs in response to reception of successive timing pulses from the timing pulse generator 22 via counting input C. Thus, the alarm signal generator 22 generates an alarm signal in response to the ninth output signal of nine consecutive output signals of the counter C provided, of course, that no erase or reset signal is received at the input R during the interval of time which is required by the timing pulse generator 22 to transmit nine successive pulses.

The operation is as follows:

When the generator 22 transmits a first timing pulse, the pump 1 delivers a first metered quantity of liquid from the source 3 into the outlet 4 whereby such liquid lifts the actuator 5 from the illustrated inoperative position to the level of the outlet portion 6 and causes the sensor 7 to emit a presence indicating 0-signal to the corresponding inputs of the NOR circuits 12, 14 and 15. The 0-signal from the sensor 7 causes the output of the OR circuit 10 to transmit an 0-signal which is inverted by the inverter 11 so that the NOR circuit 12 transmit a 1-signal. The other input of the OR circuit 10 also receives an 0-signal until and unless the capacitor 17 of the R-C circuit 16, 17 is charged by the 1-signal at the output of the NOR circuit 14; such 1-signal is generated simultaneously with appearance of a 1-signal at the output of the NOR circuit 12. The generation of a positive 1-signal at the output of the NOR circuit 14 results in the generation of an 0-signal at the output of the NOR circuit 15. The time constant of the R-C circuit 16, 17 is selected in such a way that, if the viscosity of liquid which is being conveyed by the pump 1 is relatively low, the non-floating actuator 5 returns to the illustrated inoperative position beneath the outlet section 6 before the capacitor 17 of the R-C circuit 16, 17 is sufficiently charged to ensure that the other input of the NOR circuit 14 receives a positive 1-signal by way of the high ohmic resistance 18. Therefore, the sensor 7 again emits a positive 1-signal (which causes the outputs of the NOR circuits 14 and 15 to transmit 0-signals) prior to expiration of the turn-on delay of the oscillator 9. Consequently, the capacitor 17 discharges by way of the resistance 16 and the output of the oscillator 9 (i.e., the output of the NOR circuit 15) continues to transmit an 0-signal.

When the 0-signal (presence indicating signal) at the output of the sensor 7 disappears, i.e., when the corresponding input of the NOR circuit 12 receives a positive 1-signal, the resetting input R of the counter 20 in the evaluating circuit 19 receives an 0-signal which resets the counter to zero before the input C of this counter receives the next pulse from the timing pulse generator 22. This means that the transmission of next timing pulse to the input C again entails the generation of a signal at the first (rather than at the second) output of the counter 20 and the entire sequence of steps is repeated in the aforedescribed manner.

The light emitting diode 25 transmits a short-lasting visible signal in response to the emission of each presence indicating 0-signal at the output of the sensor 7.

If the viscosity of liquid in the source 3 is relative high, namely when such viscosity is sufficiently high to delay the downward movement of the actuator 5 following a working stroke of the membrane in the pump 1 so that the membrane begins the next working stroke before the actuator 5 descends beneath the outlet portion 6, the sensor 7 emits a persistent presence indicating 0-signal as long as the pump 1 remains in operation. In other words, those inputs of the NOR circuits 12, 14 and 15 which are connected with the output of the sensor 7 receive an uninterrupted 0-signal. In addition, the output of the oscillator 9 (namely the output of the NOR circuit 15) transmits rectangular pulses because the capacitor 17 is charged in response to appearance of a positive 1-signal at the output of the NOR circuit 14 until the 0-signal at the output of the NOR circuit 14 reappears in response to transmission of a positive 1-signal to the other input of the NOR circuit 14 via resistance 18. This causes the capacitor 17 to discharge and to be charged again but with a different polarity. Therefore, the output of the oscillator 9 (i.e., the output of the NOR circuit 15) transmits alternating 1-signals and 0-signals. Consequently, the OR circuit 10 also generates corresponding rectangular pulses at the same frequency as the oscillator 9. Signals from the output of the OR circuit 10 are feedback signals which are transmitted to the resetting input R and each of which causes a resetting of the counter 20 to zero. Furthermore, the diode 25 transmits a visible signal in response to each feedback signal from the output of the OR circuit 10. The pulse repetition frequency of the oscillator 9 is selected in such a way that it matches or exceeds the frequency of pulses which are transmitted by the timing pulse generator 22. Therefore, the trailing flank of each output signal from the NOR circuit 12 entails a resetting of the counter 20 before the input C receives the next pulse from the timing pulse generator 22.

If the actuator 5 continues to dwell in the illustrated inoperative position or at a level beneath the outlet portion 6 while the timing pulse generator 22 transmits working pulses to the pump 1 and timing pulses to the input C of the counter 20, this signifies that the outlet 4 does not deliver metered quantities of liquid into the conduit 50. Such situation can develop when the source 3 is empty or when the liquid in the outlet 4 has evaporated, for example, as a result of prolonged idleness of the pump 1. This means that the metering pump 1 performs idle strokes and the sensor 7 fails to emit presence indicating 0-signals. In other words, the corresponding inputs of the NOR circuits 12, 14, 15 receive positive 1-signals. Therefore, the oscillator 9 remains idle and the output of the NOR circuit 12 transmits a continuous 0-signal. The result is that the transmission of successive pulses from the timing pulse generator 22 to the input C of the counter 20 entails the transmission of pulses to successive outputs of the counter. The transmission of a signal to the ninth output of the counter 20 results in the generation of an alarm signal at 21. The light emitting diode 25 remains inactive as long as the OR circuit 10 fails to transmit a feedback signal.

The situation is analogous if the pump 1 is defective, i.e., if the actuator 5 fails to rise to the level of the outlet portion 6 due to a malfunction of the pump rather than as a result of the absence of liquid in the source 3. Thus, the alarm signal generator 21 will generate a signal when the source 3 is empty as well as when the pump 1 is defective but will not generate an alarm signal if the outlet 4 receives metered quantities of liquid irrespective of the viscosity of such liquid.

It will be noted that, when the viscosity of conveyed liquid is low, the oscillator 9 remains inactive because the presence indicating signal at the output of the sensor 7 disappears prior to expiration of the delay which is selected for activation of the oscillator. Therefore the output of the OR circuit 10 transmits a feedback signal or resetting signal to the input R of the counter 20 before the pulse generator 22 transmits the next timing pulse (to the input C of the counter 20 as well as to the pump 1) so that the counter 20 is reset to zero subsequent to receipt of each and every timing pulse, i.e., the counter 20 is incapable of transmitting signals to its second, third, etc. outputs and the alarm signal generator 21 remains inoperative. It is clear that the input of the alarm signal generator 21 can be connected to any other output (even to the first output) of the counter 20. This depends upon the desired timing of alarm signal generation, i.e., whether in response to the absence of delivery of metered quantities of liquid via outlet 4 during one, two or more consecutive working strokes of the pumping or liquid displacing element of the pump 1.

When the viscosity of the conveyed liquid is high so that the actuator 7 is incapable of reassuming its inoperative position upon completion of each working stroke of the liquid displacing element of the pump 1, the oscillator 9 is turned on as soon as the period of persistence of a presence indicating signal from the sensor 7 exceeds the delay which is required to activate the oscillator 9 in response to transmission of an 0-signal from the output of the sensor 7 to the corresponding input of the NOR circuit 14. The evaluating circuit 19 then receives pulsating feedback or resetting signals from the output (NOR circuit 15) of the oscillator 9 to thus simulate the transmission of a discontinuous presence indicating signal. Therefore, the alarm signal generator 21 remains idle unless the presence indicating signal actually disappears or if a presence indicating signal is generated before the timing pulse generator 22 transmits a predetermined number of pulses, i.e., before the pump 1 completes a preselected number of working strokes. However, the alarm signal generator 21 is activated without fail if the actuator 5 remains in the inoperative (lower end) position which is shown in the drawing while the timing pulse generator 22 transmits pulses to the pump 1 and to the input C of the counter 20.

While it is possible to employ other types of oscillators, the illustrated oscillator 9 is preferred at this time due to its simplicity. Such oscillator comprises a relatively small number of readily available components As mentioned above, the frequency of signals which are transmitted by the output of the oscillator 9 at least equals but can exceed the frequency of pulses which are generated by the timing pulse generator 22. This ensures that, when the operation of the pump 1 is satisfactory and the source 3 contains an adequate supply of liquid, the resetting input R of the counter 20 receives signals at a frequency which ensures that the n-th (e.g., ninth) output of the counter 20 cannot transmit a signal and, therefore, the alarm signal generator 21 remains idle.

The purpose of the light emitting diode 25 is to generate a succession of readily detectable signals which are generated at the frequency at which the pump 1 delivers metered quantities of liquid into the conduit 50. The diode 25 generates visible signals irrespective of whether the output (NOR circuit 12) transmits to the resetting input R signals due to repeated descent of the actuator 5 to its inoperative position or in response to the generation of pulses by the oscillator 9, i.e., as long as the pump 1 actually delivers metered quantities of liquid irrespective of the viscosity of such liquid. The attendants can ascertain whether or not the metering operation of the pump 1 is satisfactory by observing the signals which are generated by the diode 25, i.e., the absence of visible signals indicates that the operation of the pump 1 is unsatisfactory, either because the pump is defective, because the timing pulse generator 22 is defective or because the source 3 does not contain an adequate supply of liquid.

The improved apparatus is susceptible of many modifications without departing from the spirit of the invention. For example, the sensor 7 can be installed at a level below the outlet section 6, i.e., nearer to the housing or body of the pump 1, and can be designed in such a way that it transmits an 0-signal when the actuator 5 has risen to the level of the outlet section 6 but is located outside of operating range of the sensor. In other words, the sensor 7 can be caused to generate signals which denote the absence of the actuator 5 in the illustrated inoperative position in the lowermost portion of the outlet 4. This is tantamount to an indication that the actuator 5 has entered the portion 6 of the outlet 4.

Furthermore, the magnetically operated diaphragm pump 1 which is shown in the drawing can be replaced with a motor-operated pump, e.g., a piston pump. The apparatus then comprises a second sensor which monitors the strokes of the pump piston and performs the function of the timing pulse generator 22 in that it transmits a pulse to the input C of the counter 20 in response to each working stroke of the pump piston. Diaphragm pumps of the type capable of being used with the apparatus of the present invention are disclosed, for example, in U.S. Pat. Nos. 4,507,062 and 4,537,575 to which reference may be had if necessary.

Still further, the sensor 7 need not constitute or include a Hall generator. For example, the sensor can constitute a presence indicating proximity detector in the form of a dry-reed contact, and inductive sensor, a capacitive sensor or an optical sensor employing a radiation source and an optoelectronic transducer. In such apparatus, the actuator 5 need not necessarily constitute or include a permanent magnet. Thus, except if the sensor includes or constitutes a dry-reed contact, the actuator can be made of a non-magnetic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for monitoring the flow of a liquid in an upwardly extending outlet of a metering pump which admits into the outlet metered quantities of liquid at preselected intervals, comprising a signal emitting sensor adjacent said outlet; a non-floating actuator provided in said outlet and operative to rise in said outlet from an inoperative position at least in response to the first of a series of successive admissions of liquid into said outlet to thereby induce the emission by said sensor of a presence indicating signal which persists until said actuator reassumes said inoperative position; evaluating means including alarm signal generating means; and an oscillator having input means connected with said sensor and output means connected with said evaluating means and arranged to transmit to said evaluating means signals with a delay, which equals or approximates one of said preselected intervals, only when the signal from said sensor persists for the duration of said delay.

2. The apparatus of claim 1, wherein said oscillator is a rectangular wave oscillator.

3. The apparatus of claim 1, further comprising an OR circuit having an output connected with said evaluating means, a first input connected with said sensor, and a second input connected with the output means of said oscillator, said alarm signal generating means being operative to generate an alarm signal in the absence of a signal from said OR circuit during a predetermined number of successive preselected intervals.

4. The apparatus of claim 3, wherein the input means of said oscillator comprises a first NOR circuit having a first input connected with said sensor, a second input and an output, the output means of said oscillator comprising a second NOR circuit having a first input connected with said sensor, a second input connected with the output of said first NOR circuit and an output connected with the second input of said OR circuit, said oscillator further comprising an R-C circuit connected between the outputs of said NOR circuits.

5. The apparatus of claim 4, wherein said R-C circuit includes a resistance and said oscillator further comprises means for connecting said resistance with the second input of said first NOR circuit.

6. The apparatus of claim 5, further comprising means for connecting the first input of said first NOR circuit with the first input of said OR circuit.

7. The apparatus of claim 3, wherein said evaluating means further comprises a counter having a resetting input connected with the output of said OR circuit and at least one output connected with said alarm signal generating means.

8. The apparatus of claim 7, wherein said counter further comprises a counting input and further comprising means for transmitting to said counting input pulses at said preselected intervals, said at least one output of said counter being operative to transmit to said alarm signal generating means a signal in response to transmission of a predetermined number of pulses to said counting input in the absence of a signal to said resetting input.

9. The apparatus of claim 3, wherein said oscillator is a rectangular wave oscillator arranged to transmit signals at a frequency which at least matches the frequency of admission of liquid into said outlet.

10. The apparatus of claim 9, further comprising generator means operative to transmit to the pump and to said evaluating means timing pulses at said intervals, the frequency of admission of liquid into said outlet matching the frequency of said timing pulses.

11. The apparatus of claim 3, further comprising means for generating visible signals in response to signals at the output of said OR circuit.

12. The apparatus of claim 11, wherein said means for generating visible signals includes a source of electrical energy, a radiation source in series with said energy source, and a logic element between said OR circuit and said radiation source.

13. The apparatus of claim 1, wherein said sensor comprises a Hall generator.

14. The apparatus of claim 13, wherein said actuator comprises a permanent magnet.

* * * * *